United States Patent

[11] 3,630,327

| [72] | Inventor | Roy A. Nelson |
| | | Grand Prairie, Tex. |
| [21] | Appl. No. | 66,419 |
| [22] | Filed | Aug. 24, 1970 |
| [45] | Patented | Dec. 28, 1971 |
| [73] | Assignee | LTV Aerospace Corporation |
| | | Dallas, Tex. |

[54] BRAKING AND COUPLING MECHANISM
18 Claims, 12 Drawing Figs.

[52] U.S. Cl. .................................................... 192/8 R,
74/424.8 A
[51] Int. Cl. ............................................ F16d 57/10
[50] Field of Search .......................................... 192/8, 7,
15; 74/424.8 A

[56] References Cited
UNITED STATES PATENTS
2,344,797 3/1944 Briggs et al. .................. 192/8

| 2,626,027 | 1/1953 | Anderson...................... | 192/8 |
| 3,401,777 | 9/1968 | Williams....................... | 192/8 |
| 3,448,840 | 6/1969 | Rosin ............................ | 192/8 |

*Primary Examiner*—Benjamin W. Wyche
*Assistant Examiner*—Randall Heald
*Attorney*—H. C. Goldwire ABSTRACT: A mechanism for connecting a reversible, rotary driving means to a load to be positioned thereby and employing a sleeve having opposite end portions engaged by oppositely directed threads or the like with input and output members that are rotatable but not translatable relative to each other. Forces imposed on the sleeve and originating in torques imposed on the input and/or output members urge the sleeve ends into braking contact with one or the other of a pair of annular members, each of which members is located at a respective end of the sleeve and is free to rotate only in a direction opposite to that in which the other of such members is free to rotate. Several modifications of the invention are disclosed.

PATENTED DEC 28 1971 3,630,327

ROY A. NELSON
INVENTOR

BY *H C Holdmire*
ATTORNEY

PATENTED DEC 28 1971

ROY A. NELSON
INVENTOR

BY H.C. Goldwin

ATTORNEY

ROY A. NELSON
INVENTOR

BY *H C Goldwire*

ATTORNEY

BRAKING AND COUPLING MECHANISM

This invention relates to devices used to couple a rotary driving means to a load to be moved and positioned thereby, and more particularly to such a mechanism that brakes and locks the load when the rotary driving means is inoperative and that prevents overspeeding of the rotary driving means and/or overrunning of the desired load position when the driving means is operative.

Various mechanisms are used to couple a rotary driving means to an item to be moved and positioned thereby. One variety of such a mechanism is capable of acting not only as a directly driving coupling when the rotary driving means is operative, but is also capable of preventing torque-producing forces from the item to be moved and positioned from being transmitted back through the mechanism to the rotary driving means, thus preventing either overspeeding of the rotary driving means or overrunning of the desired load position, if the torque-producing force is in the same direction as the torque being produced by the rotary driving means. In some forms, such a mechanism is further capable of acting as a brake, when the rotary driving means is inoperative, to prevent torque-producing forces from being transmitted back through the mechanism to the idle rotary driving means and concurrently to lock the item to be moved and positioned in a set position.

A braking and coupling mechanism may be employed for direct coupling of a rotary driving means to an item to be positioned; generally, however, a braking-coupling mechanism is used in cooperation with an actuator or gearbox which either reduces the rotary speed of the rotary driving means or changes the rotary motion to linear motion. The mechanism, therefore, is generally located between the rotary driving means and an actuator or gearbox. Such a mechanism, when used to couple a rotary driving means to an actuator, is usually configured to have input and output drive shaft connections positioned within and extending out of a housing or supporting structure which is rigidly mounted on fixed structure. A braking-coupling mechanism, not always a separate device, may be incorporated within an actuator or gearbox. This has been frequently done, for example, in the aircraft industry where specially designed equipment is often necessary and space limitations are critical.

Braking-coupling mechanisms are especially desirable components for use in positioning systems utilizing ball screw devices, for the friction in most ball screw devices is so low that a load at the ball screw device output connection will tend to reverse or overspeed the ball screw device driving means.

Most actuators incorporating a ball screw device efficiently utilize, to position a load, an input torque provided by a rotary driving means; for little of the input torque is needed to overcome frictional forces between the balls and the screw. The driving means for ball screw actuators, therefore, usually require one-third or less the power required for driving means of other types of actuators. Ball screw actuators are utilized throughout the industry, but are exceptionally attractive for actuation of control surfaces for airplanes because of the relatively smaller and, consequently, lighter-weight driving means that ball screw actuators require.

Existing braking-coupling devices have numerous shortcomings, especially in applications where synchronization of multiple positioning systems is essential and loads themselves impose torque-producing forces on the actuator output connections that result in torques either in the same direction as the torque from the rotary driving means or in torques in the opposite direction; and such load-imposed torques may be just as frequent in one direction as in the other. Existing braking-coupling devices have further, undesirable characteristics in applications where weight and cost of the positioning systems are influencing factors, long operating life of the devices is necessary, and reliable lockup, release, and positioning of the load to be moved and positioned are mandatory.

One type of existing braking-coupling mechanism works well enough when new but becomes unreliable with wear. Such mechanisms usually have the common feature of components, such as levers and ball-ramp devices, that move to apply a force to a brake; but the movement of these components is limited, with the result that, when they must move farther and farther to compensate for brake wear, they eventually reach their limit of movement, and slippage then occurs. Without adjustment or replacement of parts, more and more slippage occurs until little or no braking capability is left. Most existing braking-coupling devices have no convenient method of adjustment for wear to prolong their service life. Adjustment in many types of such devices entails partial disassembly for replacement of worn parts, the addition of shims, or the obtaining of access to adjusting screws.

Still other types of braking-coupling devices require very close manufacturing tolerances which vastly increase the unit cost of each device and the probability of failure because of contamination, such as the introduction of metallic particles generated from wear or during manufacturing, into clearances between moving parts. A braking-coupling mechanism, requiring close manufacturing tolerances and containing components made of dissimilar metals each having different coefficients of expansion, is said to be temperature sensitive if any differential thermal expansion could cause possible seizing or galling of components or could cause an increase in clearances resulting in reduced braking power of the device. Temperature-sensitive mechanisms have, of course, restrictive uses. In other types of braking-coupling mechanisms, there are intentionally incorporated clearances between connecting parts that result in looseness which makes difficult the synchronization of multiple positioning systems and precise positioning of a load, as, for example, control surfaces of an airplane. "Looseness" refers herein to a condition permitting relative movement or play between two parts drivingly connected so that motion of one part relative to the other can occur. Limited back-motion of the driven member, therefore, can occur with respect to the driving member at any time. Looseness-producing clearances are necessary in many existing braking-coupling devices which use arms or levers either to move and expand brakeshoes or to move other components into and out of contact with friction surfaces; still other braking-coupling devices contain intentionally provided gaps between the teeth of splines to delay movement of one shaft while, for example, drivingly connected slip-clutches can disengage brakes.

Still another type of braking-coupling device performs well when primarily subjected to opposing loads, but wears out rapidly under conditions resulting when an object to be moved by an actuator tends to be moved by other forces (e.g., airloads) in the same direction as that in which the actuator and/or driving means is attempting to move them; such load is usually referred to as an aiding load. Braking-coupling mechanisms that wear out rapidly under aiding loads inherently incorporate components which continually drag or rub rotating surfaces under an aiding-load condition. Some mechanisms require input torques from the rotary driving means that are larger than the torques required to move the load. This is true for devices having one brake continuously acting in one rotative direction and another brake continuously acting in the other rotative direction; hence, the input torque must override a brake to move and position the load. As soon as the driving means is turned off and rendered inoperative, the brakes immediately lock the load in position. Still other braking-coupling devices incorporate continuously slipping clutches which consume and waste input torque from the rotary driving means, thereby lowering the efficiency of the positioning system. Another type of such mechanism rapidly wears out when subjected to high rates of rotation because centrifugal forces acting on internal components cause them to move and drag against rotating surfaces. This type of braking-coupling device is typified by the incorporation of a rotating, annular braking surface combined with internal brake shoes held away from that surface by springs.

Some other types of braking-coupling mechanism require specific limitations, often necessarily maintained within close tolerances, on the maximum and minimum braking capacities of their brakes. Braking capacity may be defined in terms of percentage of input torque e.g., 200 percent of the input torque). Braking capacity is controlled by coefficients of friction of the braking surfaces. Usually, then, particular braking-surface materials are used that will have the proper coefficients of friction. Experience, however, has shown this type of device is very unreliable because wear, temperature, and contamination (introduction of foreign particles between braking surfaces) radically change or affect coefficients of friction. If a coefficient of friction becomes too low, the device employing it will not brake sufficiently to lock the load; and, if the coefficient of friction becomes too high, the release of the load is prevented, for the torque required to release the brake exceeds the torque capacity of the driving means. Another type of braking-coupling mechanism incorporates a spring which applies a force to brake discs; but, should a load to be moved and positioned transmit a torque-producing force to the mechanism which exceeds the constant spring force applied to the brake discs, the mechanism will slip. Great care must, therefore, be used in determining the maximum torques the load to be moved and positioned will transmit to the braking-coupling device to assure the selection of a spring that will supply an adequate force.

Still another type of braking-coupling mechanism is not capable of small incremental adjustments of the position of the load. This type of device usually incorporates a continuously operating brake that must be overpowered. Alternatively, it utilizes a single, locking-spring clutch on its output connection, which clutch is unlocked by rotation of the input connection in either rotative direction, with the consequence that a change in the direction of the feedback torque from the load, while the load is being moved, could prevent braking. Other types of braking-coupling devices have no mechanical brake releases; thus, once the load is locked, a momentary overpowering of the brake is necessary to initiate the release. This type of device may incorporate two rotatably mounted, annular braking components, one of which is prevented from rotating in one direction and the other of which is prevented from rotating in the opposite direction. Rotation of the input or output connection of this type of mechanism will cause an internal member of the mechanism to move and come into contact with one of the annular braking components. Should contact be made with one of the annular braking components by the internal member while the internal member is tending to rotate in the direction in which the annular braking component cannot rotate, then braking and locking will occur. In order to break such contact with the surface of the annular braking component, however, a momentarily overpowering torque is required to initiate movement of the internal member.

Heretofore, some braking-coupling mechanisms could overcome some of the above-mentioned problems, but always at the expense of retaining one or more of the remaining shortcomings.

It is, accordingly, a major object of the present invention to provide a new and improved braking-coupling mechanism for connecting a reversible, rotary driving means to a load to be moved thereby.

Another object of the present invention is to provide a braking-coupling device with braking and locking capabilities substantially unaffected by wear, temperature, or contamination of braking surfaces of the mechanism.

A further object is to provide, in such a device, a mechanical brake-releasing mechanism which eliminates the need of excessive torque to override the brake for releasing the load for movement, and permits movement of the load in small, accurately controlled increments.

Yet another object is to provide a braking-coupling device having means for convenient, external adjustment for wear.

A still further object is to provide a braking-coupling mechanism that is as durable, reliable, and smooth in operation when positioning a load which acts in the aiding direction as it is when positioning a load which acts in the opposing direction with respect to the torque direction of the driving means.

Still another object is to provide a braking-coupling mechanism not only without intentionally provided looseness, but without any backlash which is above the negligible and acceptable limits within which synchronization of multiple positioning systems and precise positioning of the load may be obtained.

An additional object is to provide such a device that is simple, compact, and free of the need of close manufacturing tolerances which would increase the unit cost of the mechanism and increase the probability of failure due to contamination or wear.

Another object is to eliminate the need, in a braking-coupling device, for closely controlled tolerances on coefficients of friction and maximum braking capacity, thereby obviating the problem of seizure and unreleasable locking occasioned by galling or undesired increase in maximum braking capacity on the one hand, or of loss of locking capability accompanying wear and a consequent reduction of braking capacity on the other.

A further object of this invention is to eliminate brake slippage in a braking-coupling device attributable to load-imposed torques.

Yet another object is to provide a braking-coupling mechanism free of components caused to move against rotating surfaces by centrifugal forces, thereby providing a mechanism that works as well at high rates of rotation as at low rates of rotation.

A still further object is to provide such a device which does not continuously consume and waste input torque.

Other objects and advantages will be evident from the specification and claims and the accompanying drawing illustrative of the invention.

Figure 1:
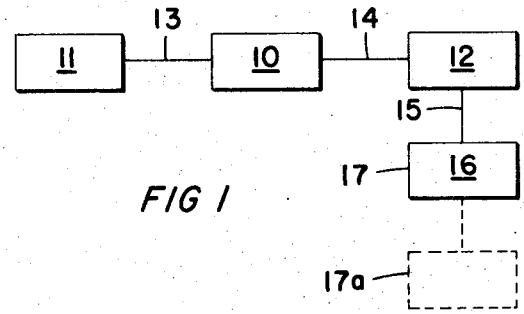
FIG. 1 is a schematic diagram of a positioning system incorporating the present invention.

With reference to FIG. 1, a schematic diagram of a positioning system incorporating a braking and coupling mechanism or device 10 is shown. The mechanism 10 connects a reversible, rotary driving means 11 to an actuator 12 by coupling their respective shafts 13, 14. The actuator 12, which converts rotary motion to linear motion, is connected to a load 16 by a ball screw 15 and moves and positions the load, as between a first position 17 in which the load is shown in solid line and a second position shown at 17a in broken line. If the actuator 12 is not needed, or if the actuator is considered part of the load 16, then the braking-coupling mechanism 10 directly couples the rotary driving means 11 to the load; in each case, the load is moved by the driving means. In either case the braking-coupling device 10 functions to transmit torque from the driving means 11 to the load 16 or actuator 12 when the driving means is operative and, concurrently, prevents torque-producing forces from the load from being transmitted back to the driving means. The rotary driving means 11, therefore, cannot be reversed or overspeeded by torque-producing forces from the load 16. When the rotary driving means 11 is inoperative, the braking-coupling mechanism 10 further acts as a brake which locks the load 16 in a set position and prevents torque-producing forces from the load from being transmitted to the idle driving means.

In subsequent paragraphs, the direction of rotation of any item described shall be determined by viewing the rotation from the side of the braking-coupling mechanism 10 that is connected to the rotary driving means 11.

Figure 2:
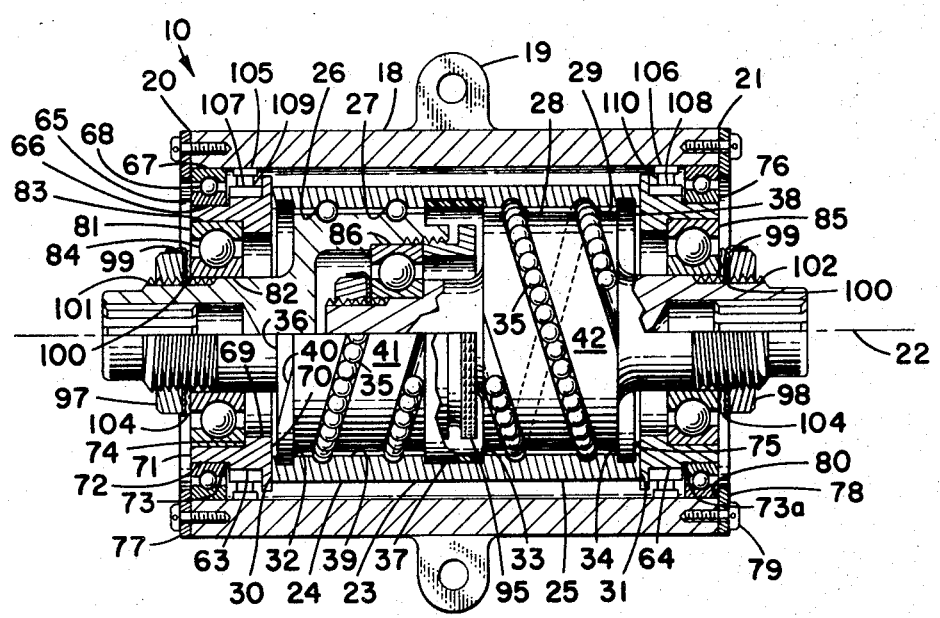
FIG. 2 is a longitudinal, partially sectional view of the present invention.
Figure 2A:
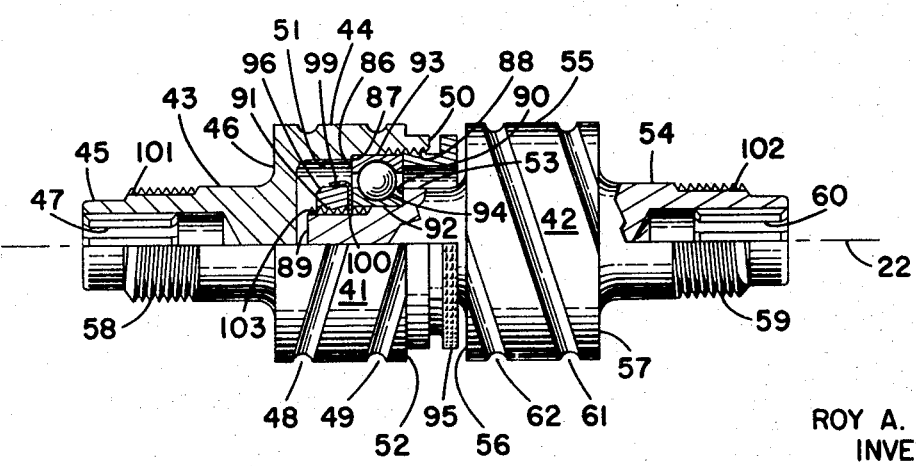
FIG. 2A is a longitudinal, partially sectional view of the input and output members of FIG. 2 connected as a subassembly.

Referring now to FIG. 2 and FIG. 2A, the braking-coupling mechanism 10 comprises a supporting structure 18 preferably of a hollow, cylindrical shape and provided on its exterior with one or more mounting lugs 19 providing means for fixed mounting of the supporting structure on any desired fixed structure. The supporting structure 18 has first and second open ends 20, 21 which are rigidly connected in a mutually fixed relationship by the intervening material of the supporting structure and which ends are transfixed by the supporting structures longitudinal axis 22. Where the operating environment permits and minimum weight is desirable, the hollow, cylindrical shape has cutouts or lightening holes (not shown). Rigid structural integrity of the supporting structure 18, however, must be maintained in order to connect and hold the open ends of the supporting structure in a mutually fixed relation.

A sleeve 23 having a hollow, cylindrical shape, a longitudinal axis 22, and first and second end portions 24, 25 is coaxially positioned within the supporting structure 18. The sleeve first end portion 24 has rounded-bottom, helical threads 26, 27 which are formed in the inner, cylindrical surface of the sleeve, which surface is symmetrically disposed about the sleeve axis 22. Each thread 26, 27 is of uniform depth throughout its length. The sleeve second end portion 25 has similar threads 28, 29 which are opposite in direction to the threads of the first end portion 24. Each sleeve end portion 24, 25 has an end face 30, 31 lying in a plane perpendicular to the sleeve's longitudinal axis 22; hence, the end faces 30, 31 are parallel with each other. Formed in the interior surface of the sleeve 23 are at least three grooves 32, 33, 34 which are parallel to each other and to the sleeve end faces 30, 31 and which are mutually spaced along the sleeve's longitudinal axis 22. As shown, the central groove 33 lies between and is connected with the inner, open ends of the first and second end portion threads 26, 27, and 28, 29. The remaining grooves 32, 34 are located adjacent the sleeve's first and second end faces 30, 31 and each of the sleeve threads 26, 27, and 28, 29 opens, at its remaining end, into a respective one of these grooves. Means provided for preventing the escape of balls 35 (described later) from the threads 26, 27, and 28, 29 comprise resilient, annular retainers 36, 37, and 38 positioned within the grooves and extending substantially flush with the sleeve internal surface 39. A representative material for these retainers is polytetrafluoroethylene, commonly sold under the trademark "Teflon." For installation purposes, a diagonal, cross-sectional cut 40 may be required through the retainers.

The braking-coupling device 10 contains an input member 41 and an output member 42. The input member 41 is generally cylindrical, has a longitudinal axis 22 coincident with the supporting-structure axis 22, and has a first end portion 43 with a diameter smaller than the diameter of the remaining, second end portion 44. The input member first end portion 43 has an externally threaded portion 58 near its end 45 and is terminated by a relatively large shoulder 46 marking the junction of the larger-diameter second end portion 44 with the smaller-diameter first end portion 43. The input member 41 is rotatably mounted (by means described later) within the supporting structure first end 20 and the sleeve first end portion 24. Part of the input member first end portion 43 is hollow, extends from the first end of the supporting structure 18, and has means for drivingly connecting the input member 41 to a rotary driving means 11, the connecting means being in the form of internal splines 47. The input member second end portion 44 has external threads 48, 49 matching the sleeve first end portion internal threads 26, 27 in shape, depth, width, and direction. When the sleeve first end portion internal threads 26, 27 are in register with the input member external threads 48, 49 the threads cooperatively form circular channels capable of receiving a plurality of uniformly sized balls 35. The second end portion 44 has an end face 50 lying in a plane perpendicular to the longitudinal axis 22, most of which face is occupied by a cylindrical recess 51 which is coaxial with the axis. The input member second end portion 44 has, formed on its external surface, a step 52 with a depth of at least that of the input member external threads 48, 49. The step 52 is formed on the input second end portion 44 by a juncture of a smaller-diameter section of the second end portion and the remaining larger-diameter, second end portion. One end of each of the input member external threads 48, 49 opens into the input member second end portion external step 52 and the other ends extend through the surface defined by the shoulder 46.

Like the input member 41, the output member 42 is generally cylindrical and has a longitudinal axis 22 which is coincident with the supporting-structure axis 22. The output member 42 has first and second end portions 53, 54 each of which portions has a diameter smaller than that of a remaining, middle portion 55. The output member first and second end portions 53, 54 are terminated by relatively large shoulders 56, 57 marking the junctions of the larger-diameter output member middle portion 55 with the smaller-diameter output member first and second end portions 53, 54. The output member 42 is rotatably mounted (by means described later) within the supporting structure second end 21 and the sleeve second end portion 25. Similarly, the output member first end portion 53 is rotatably mounted (by means described later) within the recess of the input member second end portion 44. Part of the output member second end portion 54 is hollow, extends from the supporting structure 18, and has an externally threaded portion 59 and means in the form of internal splines 60 for drivingly connecting the output member 42 to a load 16 or an actuator 12. The output member middle portion 55 has external threads 61, 62 matching the sleeve second end portion internal threads 28, 29 in shape, depth, width and direction. When the sleeve second end portion internal threads 28, 29, are in register with the output member external threads 61, 62 the threads cooperatively form circular channels capable of receiving a plurality of uniformly sized balls 35. The output member external threads 61, 62 open on one end into shoulder 56, and open on the other end into shoulder 57.

Uniformly sized balls 35 are placed within the thread-channels formed by the sleeve internal threads, 26, 27, and 28, 29 and the respective matching, in-register input and output member external threads 48, 49, and 61, 62. The thread-channels are substantially filled with the balls 35, sized to have a close sliding and rolling fit with the thread-channels. The balls 35, therefore, enable the input and output members 41, 42 to transmit and receive torque-producing forces from the sleeve 23 in a manner similar to that of a typical ball screw and nut arrangement.

A first annular member 63 is rotatably mounted within the supporting structure 18 on a ball bearing 65 which has inner and outer races 66, 67 that contain a plurality of balls 68. The ball bearing 65 is located within the substantially flush with the supporting-structure first end 20 and is radially fixed with respect to the supporting-structure axis 22, since the complete external surface of the ball bearing outer race 67 contacts and fits against the internal surface of the supporting structure 18.

The first annular member 63 and the inner race of the ball bearing 65 each rotates about an axis 22 which coincides with the supporting-structure axis 22.

The first annular member 63 has a first end portion 69 with an end face 70 that lies in a plane perpendicular to the first annular member axis 22 and confronts a respective end face of the sleeve 23. The remaining, second end portion 72 of the first annular member 63 has an end face 71 that lies in a plane perpendicular to the first annular member axis 22 and an external diameter smaller than the external diameter of the first annular member first end portion 69. The external smaller-diameter first annular member second end portion 72 is terminated by an external shoulder 73 marking the junction of the first annular member second end portion 72 with the first annular member first end portion 69, the external surface of which has a larger diameter. The above-mentioned ball bearing 65 is mounted on the first annular member second end portion 72 with the ball bearing inner race 66 immediately surrounding the first annular member second end portion 72, the inner race being placed against the first annular member external shoulder 73 and substantially flush with the first annular member second end face 71. The first annular member second end portion 72, additionally, has an internal diameter larger than the internal diameter of the first annular member first end portion 69, the juncture of the two portions being marked by an internal shoulder 74.

A second annular member 64 is substantially identical in construction to the first annular member 63, except that the two members are mirror images of each other. The first and second annular members' first end faces 70, 75, consequently, mutually face each other, and each of them confronts a respective end face of the sleeve 23. The second annular member 64 is rotatably mounted and positioned within the supporting structure 18 in a manner substantially identical to that of the first annular member 63, i.e., by means of a second ball bearing 76 similar to the bearing 65, and the second annular member 64 is located at the supporting structure second end 21.

Thin, ringlike elements 77, 78 have outer diameters approximately equal to the supporting structure outer diameter and inner diameters smaller than the inner diameter of the supporting structure 18. The ringlike elements 77, 78 are fixedly mounted on the supporting structure first and second ends 20, 21 by a plurality of machine screws 79 extending through the ringlike elements 77, 78 into the supporting structure 18. Fixedly mounted on the supporting structure 18, the ringlike elements 77, 78 form circular lips 80 extending within the cavity of the supporting structure and thereby trap the ball bearings 65, 76 within the supporting structure.

The device 10 is provided with means coaxially mounting the input, output, and annular members 41, 42, 63, and 64 for rotation thereof about the supporting structure longitudinal axis 22 and for preventing outwardly directed, axial translation of the input and output members relative to the supporting structure 18, which means will now be described. Employed in the above-mentioned, coaxial and rotatable mounting of the input member 41 and first annular member 63 are the ball bearing 65 and a ball thrust bearing 81, the latter having inner and outer races 82, 83 enclosing a plurality of balls 84 and being mounted within the first annular member second end portion 72 with the ball thrust bearing outer race positioned against the first annular member second end portion internal shoulder 74. The ball thrust bearing 81 is substantially flush with the first annular member second end face 71 and the supporting structure first end 20. The ball thrust bearing 81 is radially fixed with respect to the supporting-structure axis 22, since the complete external surface of the ball thrust bearing outer race 83 contacts and fits against the internal surface of the first annular member second end portion 72.

The ball thrust bearing 81 is also mounted on the input member first end portion 43 with the ball thrust bearing inner race 82 immediately encircling the input member first end portion. The ball thrust bearing 81 is, therefore, positioned between the input member 41 and the first annular member 63, and the first annular member is positioned between the ball thrust bearing and the above-mentioned ball bearing 65, which is positioned between the first annular member and the supporting structure 18.

For coaxial and rotatable mounting of the output member 42 and second annular member 64 in the supporting structure 18, there are employed a second ball bearing 76 and a second ball thrust bearing 85 similar to the corresponding bearings 65, 81 and located at the supporting structure second end 21. The relations of these second bearings 76, 85 to the output member 42 and the second annular member 64 are equivalent to the previously described relations of the first bearings 65, 81 to the input member 41 and the first annular member 63.

Means rotatably joining the input and output members 41, 42 in a manner preventing their translation relative to each other employ a central thrust bearing 86, as is described below.

The input member recess 51 has a step 87 located at a point intermediate and input member second end portion face 50 and the bottom of the recess. The step 87 is formed by a juncture of a larger internal diameter portion of the recess 51 extending inwardly from the input member second end portion face 50 and a smaller internal diameter portion of the recess extending outwardly from the bottom of the recess. The larger internal diameter portion of the recess has threads 88 extending inwardly a short distance from the input member second end portion face 50. The output member first end portion has a face 89 and an external step 90 formed by the juncture of a smaller-diameter, distal section of the output member first end portion 53 extending inwardly from the face and the larger-diameter, remaining section of the output member first end portion. The smaller-diameter section of the output member first end portion 53 has threads 91 extending inwardly from the face 89 to a point intermediate the face and the external step 90. The above-mentioned, central ball thrust bearing 86 has inner and outer races 92, 93 containing a plurality of balls 94, the outer race being mounted within the input member second end portion recess 51 and against the recess step 87. An annular nut 95, screwed into the recess threads 88 and positioned against the central ball thrust bearing outer race 93, axially locks and fixes the central ball thrust bearing 86 within the input member 41. The central ball thrust bearing 86 is radially fixed with respect to the input member axis 22, since the complete external surface of the central ball thrust bearing outer race 93 contacts and fits against the larger internal diameter portion of the input member second end portion recess 51. The bearing inner race 92 immediately encircles the smaller-diameter section of the output member first end portion 53 and rests against the output member first end portion external step 90.

The axial translation of the input and output members 41, 42 relative to the supporting structure 18 is prevented by the central thrust bearing 86, the above-described thrust bearings 81, 85 at the supporting structure ends, and nuts 96, 97, 98 bearing against each of the thrust bearings.

The nut 97 for example, employed at the thrust bearing 81 engages the input member first end portion threads 58 and limits motion of the bearing axially of and toward the distal end of the input member 41. A similar nut 98 is employed for engaging output member second end portions threads 59 and for limiting motion of the thrust bearing 85 along and toward the distal end of the output member second end 54. A third nut 96 engaged with the output member first-end threads 91 locks the central thrust bearing 86 against the output member first end portion external step 90. Suitable locking means, such as lock washers 99 of the kind having keys 100 engaging corresponding 101, 102, 103 in keyways the members on which the nuts 96, 97, 98 are mounted, is preferably employed for retaining each of the nuts in position.

Means for applying a slight dragging force to the sleeve 23 for opposing rotary movement of the sleeve relative to the supporting-structure axis 22 comprises, in the preferred embodiment, at least one resilient member 104 positioned on at least one of the input or output members 41, 42. For example, such a resilient member 104 is a spring washer placed between the lock washer 99 and thrust bearing 81 on the input member first end portion 43, and a similar spring washer is utilizable between the lock washer 99 and the thrust bearing 85 on the output member second end portion 54.

A means for preventing a first rotative or clockwise direction of movement of the first annular member 63 and a means for preventing a second rotative or counterclockwise direction of movement of the second annular member 64 with respect to the supporting-structure axis 22 are a pair of ratchets 105, 106. Sets of ratchet teeth 107, 108 are located on the exterior surfaces of the annular members 63, 64 between their external shoulders 73, 73a and their first end faces 70, 75. First and second pawls 109, 110 are fixedly mounted on the interior of the supporting structure 18 at locations in which each pawl 109 or 110 is adjacent and confronts a respective set of annular member ratchet teeth 107, 108. Each pawl 109 or 110 is engaged with the ratchet teeth 107 or 108 of its associated annular member 63 or 64 to prevent clockwise movement of the first annular member 63 and counterclockwise movement of the second annular member 64.

The thread directions (i.e., right-hand or left-hand( ) of the sleeve internal threads 26, 27, and 28, 29 and cooperatively corresponding input and output member external threads 48, 49, and 61, 62 are dependent on the locking directions of the annular members' ratchets 105, 106. The embodiment in FIG. 2 necessarily depicts left-hand threads for the sleeve first end portion internal threads 26, 27 and left-hand threads for the input member external threads 48, 49 to correspond with the locking against clockwise direction of movement by the first annular member ratchet 105.

Further aspects of the mode of construction are most readily understood by considering the assembly of the unit 10, which assembly is readily effected by slipping the annular nut 95 over the output member first end portion 53 and into adjacency with the shoulder 56 formed between the output member first end and middle portions 53, 55, the unthreaded portion of the nut being placed to face the output member shoulder. The central ball thrust bearing 86 is then slipped over the output member first end portion 53 with the central ball thrust bearing inner race 92 immediately surrounding the first end portion with a close-sliding fit and the inner race positioned against the first end portion external step 90. The lock washer 99 and nut 96 are installed on the output member first end portion 53 and run down on the output member first end portion threads 91 to force and hold the central ball thrust bearing inner race 92 tightly against the external step 90. The output member first end portion 53 and the central ball thrust bearing 86 are inserted into the input member recess 51, the central ball thrust bearing outer race 93 has a close-sliding fit with the larger internal diameter portion of the input member recess 51. The annular nut 95 is engaged with the input member recess internal threads 88 and is run down to force and hold the central ball thrust bearing outer race 93 tightly against the input member recess step 87. In this manner, the bearing 86 is brought into a relation with the input and output members 41, 42 wherein it substantially prevents axial movement of those members relative to each other and, concurrently, permits rotation of these members relative to each other about their coinciding axes 22.

The central resilient retainer 37 is mounted in the sleeve central groove 33. The input and output members 41, 42 (as a subassembly) are inserted and centered in the sleeve 23; both the input and output members are rotated relative to the sleeve to bring the sleeve threads 26, 27 and 28, 29 and input and output member threads 48, 49 and 61, 62, when in register, cooperatively form channels capable of receiving the uniformly sized balls 35. The balls 35 are inserted into the sleeve threads 26, 17 and 28, 29 and respective input and output members threads 48, 49 and 61, 62 at their respective thread ends adjacent the sleeve end faces 30, 31. The thread-channels of the sleeve 23 and input and output members 41, 42 are filled with the balls 35 and the outer resilient retainers 36, 38 are installed in the sleeve outer grooves 32, 34. The retainers 36, 38 prevent the escape of the balls from either end of each thread channel. Being resilient, each retainer 36, 38 or 37 is elastically deformable to permit slight motion of each set of balls 35 within its respective thread-channel. (The significance of the elastic deformation of the retainers 36, 37, 38 will appear later.) Also, the balls 35 hold the sleeve 23 in a coaxial relation with the input and output members 41, 42.

Next, the pawls 109, 110 are fixedly mounted, by suitable means, in the supporting structure 18 and the sleeve 23 and input and output members 41, 42, as a subassembly, are inserted and centrally positioned within the supporting structure.

The ball bearing 65 is placed on the first annular member 63 and the ball bearing and first annular member are inserted and positioned in the supporting structure 18 through the supporting structure first open end 20 and with the first annular member ratchet teeth 107 in engagement with the pawl 109. The ball bearing 76 is placed on the second annular member 64 and the ball bearing and second annular member are inserted and positioned in the supporting structure 18 through the supporting structure second open end 21 so that the second annular member ratchet teeth 108 are in engagement with the pawl 110.

The ringlike elements 77, 78 are mounted on the supporting structure first and second ends 20, 21 with machine screws 79 and lock the sleeve 23, ball bearings 65, 76, and annular members 63, 64 within the supporting structure 18, thus preventing the ball bearings and annular members from outward axial movement relative to the supporting structure.

The ball thrust bearing 81 is slipped over the input member first end portion 43 and slid inwardly toward the input member shoulder 46 until the ball thrust bearing outer race 83 contacts the first annular member second end portion internal shoulder 74. The ball thrust bearing 85 is slipped over the output member second end portion 54 and slid inwardly toward the output member shoulder 57 until positioned against the second annular member 64 in the same manner as the ball thrust bearing 81 is positioned against the first annular member 63 described above. The resilient member (spring washer) 104, lock washer 99, and nut 97 are installed on the input member first end portion 43; and the resilient member (spring washer) 104, lock washer 99, and nut 98 are installed on the output member second end portion 54. The sleeve 23 and input and output members 41, 42 are now brought into and held in a coaxial relation with the supporting-structure and annular-members axes 22.

Finally, the axial position of the nuts 97, 98 on the input and output members 41, 42 is adjusted to approximately center the sleeve 23 in the supporting structure 18 and to bring both annular members 63, 64 into relatively light dragging contact with the sleeve end faces 30, 31. Regardless of whether the input member 41 or the output member 42 is rotated, or which direction either is rotated in, a slight dragging force is imposed on the sleeve 23 by at least one of the annular members, which dragging force tends to prevent rotation of the sleeve relative to the supporting structure 18. Therefore, rotation of either the input member 41 or the output member 42 in either rotative direction tends to "screw" the sleeve 23 relative to the input and output members, which action results in axially translating the sleeve relative to the supporting structure 18. The axial movement of the sleeve 23 relative to the supporting structure 18 forces the sleeve end faces 30, 31 against one or the other of the annular member's confronting end faces 70 or 75. Rotary movement of the sleeve 23 and, consequently, the input or output member 41 or 42, after the sleeve is strained against one of the annular members 63, 64, is dependent on the capacity for rotation of the annular members. As noted before, the first annular member 63 is capable of rotary movement in only the counterclockwise direction, and the second annular member 64 is capable of rotary movement only in the clockwise direction. Whether the annular members 63, 64 lock the sleeve 23 or rotate with the sleeve depends, then, on the direction in which the sleeve is tending to rotate while being forced against a respective annular member.

In operation, the device of the foregoing construction and arrangement has several functional modes, in all of which modes the supporting structure 18 is rigidly mounted on any suitable, fixed structure by means of the lugs 19. When no torque is imposed on the input member 41 or the output member 42, the sleeve 23 is centered between the annular members 63, 64 by a force applied by a resilient member e.g., a spring washer) 104 positioned on at least one of the input or output members 41 or 42, and each annular member, when the sleeve is centered, is in at least lightly dragging contact with its associated sleeve end face 30, 31. Torques applied to the input and/or output members 41, 42 of the braking-coupling device 10 are transmitted to the sleeve 23 through the plurality of interconnecting balls 35 located in channels formed by the sleeve threads 26, 27 and 28, 29 and corresponding input and output member threads 48, 49 and 61, 62. Such a torque immediately tends to rotate the sleeve 23, which is still in its centered position; but the lightly dragging contact between the annular members 63, 64 and the sleeve produces a force on the sleeve that opposes the incipient rotation of the sleeve, thereby tending to cause momentary, relative rotation between the sleeve and input and/or output members. This relative rotation between the sleeve 23 and input and/or output members 41, 42 immediately initiates a wedging action between the balls 35 and the sides of the thread channels, thus substantially eliminating internal slippage within the device 10 and, consequently, promoting precise positioning of a load 16. The wedging action of the balls 35 converts the torque being transmitted to the sleeve 23 from the input and/or output members 41, 42 into torque-equivalent force components: namely, an axial thrust force and a rotational force. As will be described later, the axial thrust force received by the sleeve 23 moves the sleeve axially with respect to the supporting structure axis 22 and into contact with one of the annular members 63, 64; the direction of axial movement of the sleeve, however, is dependent upon the direction of the net axial thrust force received by the sleeve. The braking-coupling device 10 does not continuously consume and waste torque provided by the driving means 11 because of the lightly dragging contact of the annular members 63, 64 with the sleeve 23, for such torque moves the sleeve away from contact with one annular member and into firm contact with the other annular member; thus, when a torque is imposed on the input member 41 by the driving means, there is no relative movement between the sleeve and one annular member and there is substantially no dragging contact with the other annular member.

The first functional mode of the device 10 is one in which the driving means 11 is in the power-off condition and a load 16 tends to rotate the output member of the device in a clockwise direction relative to the supporting-structure axis 22. The clockwise torque thus imposed on the output member 42 rotates the output member a relatively small angular distance in the clockwise direction e.g., approximately 2 degrees). During this incipient rotation of the output member 42, the load-produced torque is transmitted from the output member to the sleeve 23 through the interconnecting plurality of balls 35 located within the sleeve threads 28, 29 and output member threads 61, 62. While transmitting the torque to the sleeve 23, the balls 35 move (as will be described) along channels formed by the sleeve threads 28, 29 and output member threads 61, 62 for a relatively short distance (e.g., approximately 0.02 inch) in a direction toward the resilient retainer 38 located at the sleeve second end face 31. This movement by the balls 35 results in the elastic deformation of the resilient retainer 38 and is required to permit the balls to roll rather than skid or slid in thread-channels, thus protecting the thread-channels from excessive wear. A wedging action takes place between the balls 35 and the sides of the thread channels that converts the torque received from the output member 42 into its equivalent force-components (an axial thrust force and a rotational force) and the balls thus transmit the torque to the sleeve 23 in the form of torque-equivalent forces. The thrust force acts in a direction that moves the sleeve 23 into firm contact with the first annular member 63 and, simultaneously, the rotational force acts in a direction which tends to rotate the sleeve in the clockwise direction. The first annular member 63 is limited to rotation in the counterclockwise direction by its associated ratchet 105; thus, the first annular member prevents clockwise rotation of the sleeve 23 as soon as the sleeve is strained against it by the axial thrust force. Before forces are transmitted from the sleeve 23 to the input member 41 by the interconnecting plurality of balls 35 located within the sleeve threads 26, 27 and input member threads 48, 49, the first annular member 63 brakes and locks the sleeve relative to the supporting structure 18. In this functional mode, therefore, the mechanism 10 not only restricts a load 16 (or actuator 12 and load 16) which applies a clockwise torque on the output member 42 to a negligible movement but also prevents the load from being transmitted back to the idle driving means 11 which is connected to the input member 41.

The second functional mode to be discussed is one in which the driving means 11 is in the power-off condition and the above-mentioned load 16 is reversed and tends to rotate the output member of the braking-coupling mechanism 10 in a counterclockwise direction relative to the supporting-structure axis 22. The load 16 produces a counterclockwise torque on the output member 42, and that torque rotates the output member a relatively small angular distance in the counterclockwise direction. In this mode, as in the first functional mode, the load-produced torque is transmitted from the output member 42 to the sleeve 23 through the balls 35, located within the sleeve threads 28, 29 and output member threads 61, 62, during the rotation of the output member. While transmitting the torque to the sleeve 23, the balls 35 move along the channels formed by the sleeve threads 28, 29 and output member threads 61, 62 in a direction toward the central, resilient retainer 37 and for the small distance permitted by the elastic deformation of such resilient retainer. The wedging action of the balls 35 against the sides of the thread channels converts the torque into its equivalent force-components and transmits those force-components to the sleeve 23. In this functional mode, the axial thrust force acts in a direction that unlocks the sleeve 23 from the first annular member 63 by relieving the strain of the sleeve against the first annular member and moves the sleeve away from the first annular member and into firm contact with the second annular member 64. Simultaneously, the rotational force-component of the torque received by the sleeve 23 tends to rotate the sleeve in the counterclockwise direction. The second annular member 64 is limited to rotation in the clockwise direction by its associated ratchet 106 and prevents counterclockwise rotation of the sleeve as soon as the sleeve is forced against it by the axial thrust force. The larger the load-imposed torque, the larger the axial thrust force which forces the sleeve 23 against the second annular member 64; thus, the device 10 eliminates brake slippage attributable to load-imposed torques, whether such torques are large or suddenly applied. Elimination of brake slippage attributable to load-imposed torques prevents the load 16 from moving out of a set position. Just as in the first functional mode, the second annular member 64 brakes and locks the sleeve 23 before any force can be transmitted from the sleeve to the input member 41 by the balls 35 located in the sleeve threads 26, 27 and input member threads 48, 49. In this second functional mode, therefore, the device 10 restricts a load 16 which applies a counterclockwise torque on the output member 42 (through actuator 12), while the driving means 11 is in the power-off condition, to negligible movement and, concurrently, prevents the load from being transmitted back to the idle driving means which is connected to the input member 41.

A third functional mode is one in which the driving means 11 is initially in the power-off condition, the load 16 tends to rotate the output member 42 of the braking-coupling mechanism 10 in the counterclockwise direction relative to the supporting-structure axis 22, and the driving means subsequently is selectively activated to the power-on and clockwise output torque condition wherein a clockwise torque is applied to the input member 41 of the mechanism for repositioning the load. When the desired position of the load 16 is reached, the driving means 11 is deactivated to its power-off condition and the load is locked, relative to the supporting structure 18 in a precise position. To effect this repositioning of the load 16, the torque provided by the driving means 11 must be greater than the oppositely directed, load-produced torque that is imposed on the output member of the braking-coupling mechanism 10. The clockwise torque thus imposed on the input member 41 by the driving means 11 rotates the input member a relatively small angular distance in the clockwise direction. During this incipient rotation of the input member 41, the torque from the driving means 11 is transmitted from the input member to the sleeve 23 through the interconnecting plurality of balls 35 located within the sleeve threads 26, 27 and input member threads 48, 49. The wedging action of the balls 35 against the sides of the thread channels converts the torque into its equivalent force-components and transmits those force-components to the sleeve 23. In this third functional mode, the axial thrust force-component received by the sleeve 23 from the driving means 11 acts in a direction toward the second annular member 64, thus adding to the axial thrust force produced by the load 16 and uninterruptingly continuing the strain of the sleeve against the second annular member; as a consequence, the sleeve and second annular member remain locked together against rotational movements relative to each other. Simultaneously with the above, a rotational force-component of the torque received by the sleeve 23 from the driving means 11 tends to rotate the same sleeve in the clockwise direction, a direction opposite to the direction that the load 16 tends to rotate the sleeve. Since the clockwise rotational force-component of the torque received by the sleeve 23 from the driving means 11 is larger than the counterclockwise rotational force-component of the torque received by the sleeve from the load 16, the net rotational force imposed on the sleeve acts in the clockwise direction; therefore, the sleeve departs from a tendency to rotate in the counterclockwise direction and tends to rotate in the clockwise direction. The second annular member 64 is free to rotate in the clockwise direction, for its associated ratchet 106 prevents only counterclockwise rotation; therefore, the mutually locked sleeve 23 and second annular member are free to rotate in the clockwise direction. Simultaneously with the above, the sleeve 23 transmits the net rotational force-component, as a clockwise torque, to the output member 42 through the interconnecting balls 35 located in the sleeve threads 28, 29 and output member threads 61, 62. The clockwise torque thus imposed on the output member 42 by the sleeve 23 is larger than the load-produced counterclockwise torque imposed on the output member; accordingly, the output member rotates in the clockwise direction. The device 10, in the above-described condition, is capable of acting as a directly driving coupling; accordingly, torque applied to the input member 41 by the rotary driving means 11 is efficiently transmitted through the mechanism 10 to the load 16 to be positioned thereby. When the desired position of the load 16 is reached and upon the driving means 11 being deactivated to place it in its power-off condition, the torque applied by the driving means to the input member 41 is eliminated. The output member 42, thus having ceased to be driven by the driving means 11 in the clockwise direction, has only a load-produced torque imposed on it, and the load-produced torque immediately attempts to reverse the clockwise rotation of the output member.

When the driving means 11 is deactivated, therefore, the axial thrust and rotational forces received by the sleeve 23 are substantially the same as described in the second functional mode (i.e., the axial thrust force acts in the direction towards the second annular member 64 and the rotational force acts in the counterclockwise direction). Since the axial thrust force acts in the same direction, whether the driving means 11 is in the power-on or power-off condition, the sleeve 23 remains uninterruptedly locked to the second annular member 64. The counterclockwise, load-produced torque received by the sleeve 23 tends to rotate the sleeve in the counterclockwise direction, but such rotation is immediately braked and locked, relative to the supporting structure 18 and with substantially no possibility of motion of the sleeve relative to the supporting structure, by the second annular member 64 and its associated counterclockwise rotation-opposing ratchet 106. When the sleeve 23 is thus locked, the output member 42 and the load 16 (through actuator 12) connected thereto are also similarly locked. Intentionally provided looseness, necessary in many existing braking-coupling devices, is not required in the present device 10; and the device is thus capable of providing precise positioning of the load 16. Furthermore, the braking-coupling mechanism 10, without requiring close manufacturing tolerances, is devoid of any looseness of connection which is above the negligible and acceptable limits within which synchronization of multiple positioning systems is obtainable. Additionally, components are not utilized which are free to move, under the influence of centrifugal forces, into dragging or sliding contact with rotating surfaces; therefore, such a mechanism 10 will work as well at high as well as low rates of rotation.

A fourth functional mode is one in which the driving means 11 is in the power-on and clockwise output torque condition, the load 16 initially tends to rotate the output member of the braking-coupling device 10 in the counterclockwise direction relative to the supporting-structure axis 22, and the load, subsequently, is reversed and tends to rotate the output member 42 in the clockwise direction relative to the supporting-structure axis. The fourth functional mode is, therefore, the same as the third functional mode, except that the load 16 changes from an opposing to an aiding load. Before the load-imposed torque changes direction, the sleeve 23 is strained against the second annular member 64 and rotated in the clockwise direction by the net force-components of torque transmitted to the sleeve as described above in the third functional mode. When the load-imposed torque received by the output member 42 changes from counterclockwise to clockwise torque, the force-components of the torque received by the sleeve 23 from the output member change direction. The axial thrust force-component of the clockwise, load-produced torque acts in a direction toward the first annular member 63, thus opposing the axial thrust force-component received by the sleeve 23 from the driving means 11. The rotational force-component of the clockwise, load-produced torque acts in the clockwise direction, thus acting in the same rotational direction as the rotational force-component received by the sleeve 23 from the driving means 11. After the change in direction of the load-imposed torque, and because the torque-producing capacity of the driving means 11 is greater than the maximum load-produced torque, the net axial thrust force-component received by the sleeve 23 continues to act in a direction toward the second annular member 64, but decreases in magnitude. Thus, the sleeve 23 remains uninterruptedly locked to the second annular member 64, and the driving means 11 (in cooperation with the braking-coupling device) continues smoothly to position the load 16 in the clockwise direction.

The amount of torque applied to the input member of the braking-coupling mechanism 10 by the driving means 11, however, is dependent upon the amount of torque required to reposition the load 16. Less torque clearly is required from the driving means 11 to position the load 16 when the load tends to move in the same direction as the driving means attempts to move the load. If the identically directed, load-produced torque is capable of rotating the output member of the braking-coupling device 10 at the same or greater rate of rotation than the driving means 11 attempts to rotate the output member 42, the torque applied to the input member of the device by the driving means is greatly reduced and the load-produced torque quickly tends to overspeed the driving means and/or to prevent precise positioning of the load. When the torque transmitted to the sleeve 23 by the input member 41 is less than the torque transmitted to the sleeve by the output member 42, however, the net axial thrust force changes direction and acts toward the first annular member 63; thus, the net axial thrust force unlocks the sleeve from the second annular member 64 by relaxing the strain of the sleeve from the second annular member and moves the sleeve away from contact with the second annular member and into contact with the first annular member. Since the rotational force-components from both the driving means 11 and the load 16 act in the clockwise direction, the sleeve 23 tends to continue rotating in the clockwise direction. The first annular member 63, however, is prevented from clockwise rotation by its associated ratchet 105, and braking thus occurs as soon as the clockwise-rotating sleeve contacts the first annular member. If the net axial thrust force acting in the direction toward the first annular member 63 is relatively small, there will be only light contact between the sleeve 23 and the first annular member, which light contact results in braking and slowing of the rate of clockwise rotation of the sleeve rather than in the complete stoppage of the sleeve rotation. If the rate of clockwise rotation of the sleeve 23 tends to slow below that rate at which the driving means 11 attempts to rotate the sleeve, then the driving-means torque imparted to the input member 41 increases, the axial thrust force received by the sleeve from the driving means becomes larger than the axial thrust force received by the sleeve from the load 16, and the net axial thrust force received by the sleeve therefore acts in a direction toward the second annular member 64. The sleeve 23 thus moves away from the first annular member 63 and back into firm contact with the second annular member 64, in which position of the sleeve no clockwise rotational braking occurs.

Unlike the existing braking-coupling devices, the device 10 described herein contains a mechanical brake-releasing mechanism of a construction which eliminates the need of excessive torque to override or to disengage brakes in order to position a load. It is important to note that the brake-releasing mechanism of the present device 10 utilizes torque-equivalent force-components to disengage and shift the sleeve from the annular member 63 or 64 that brakes and locks the load 16 relative to the supporting structure 18, with the aid of an associated ratchet 105 or 106, to the annular member that has an associated ratchet that permits rotation in the rotative direction of the driving-means torque and thus permits the driving means 11 to reposition the load. The fourth functional mode further illustrates that such a mechanism 10 is as durable, reliable, and smooth in operation when positioning a load 16 which acts in the aiding direction relative to the torque-direction of the driving means 11 as it is when positioning a load which acts in the opposing direction relative to the torque-direction of the driving means.

A fifth functional mode is one in which the driving means 11 is in the power-on and counterclockwise output torque condition, the load 16 initially tends to rotate the output member of the braking-coupling device 10 in the clockwise direction relative to the supporting-structure axis 22, and the load subsequently is reversed and tends to rotate the output member 42 in the counterclockwise direction relative to the supporting-structure axis. The counterclockwise torque thus imparted to the input member 41 by the driving means 11 rotates the input member in the counterclockwise direction. During the incipient rotation of the input member 41, the torque from the driving means 11 is transmitted from the input member to the sleeve 23 through the interconnecting balls 35 in the same manner as discussed previously. Likewise, the wedging action of the balls 35 against the sides of the thread channels converts the torque into its equivalent force-components as it transmits the torque to the sleeve 23. In this fifth functional mode, the axial thrust force-component of torque received by the sleeve 23 from the driving means 11 acts in a direction toward the first annular member 63. The clockwise, load-produced torque imposed on the output member of the device 10 is similarly transmitted to the sleeve 23 (as described previously). The axial thrust force-component of the load-produced torque received by the sleeve 23 also acts in a direction toward the first annular member 63. The rotational force-component of the torque from the driving means 11 acts in the counterclockwise direction relative to the supporting-structure axis 22, and the rotational force-component of the load-produced torque acts in the clockwise direction relative to the supporting-structure axis. When the above rotational force-components received by the sleeve 23 oppose each other, the rotational force-component of torque from the driving means 11 is always larger than the load-produced torque because the torque-producing capacity of the driving means must be larger than the maximum possible load-produced torque; otherwise, the positioning system would be incapable of positioning the load. The net rotational force-component received by the sleeve 23 therefore acts in a counterclockwise direction. The axial thrust force-components received by the sleeve 23 forces the sleeve against the first annular member 63 and lock the sleeve to the first annular so that there can be no relative rotational movement between them. Since the first member's associated ratchet 105 prevents only clockwise rotation of the first annular member, the sleeve and first annular member are free to rotate in the counterclockwise direction. Consequently, such a mechanism 10, in the above-described condition, is capable of acting as a directly driving coupling and efficiently transmits the torque from the driving means 11 to the load 16 to be positioned thereby. When the desired position is reached and upon the driving means 11 being deactivated to place it in its power-off condition, the torque applied to the input member 41 by the driving means is eliminated; accordingly, the mechanism 10 reverts to the first functional mode and the load 16 is braked and locked relative to the supporting structure 18 in a precise position with substantially no looseness. If before reaching the desired position of the load 16, however, the load is reversed and changes the clockwise, load-imposed torque received by the output member of the braking-coupling device 10 to a counterclockwise torque, such device functions (as described below) in a manner analogous to the fourth functional mode, and the driving means 11 continues smoothly and efficiently to position the load. When the load-imposed torque received by the output member 42 changes from clockwise to counterclockwise torque, the force-components of the load-produced torque received by the sleeve 23 changes directions. The axial thrust force-component of the counterclockwise, load-produced torque acts in a direction toward the second annular member 64, thus opposing the axial thrust force-component received by the sleeve 23 from the driving means 11. The rotational force-component of the counterclockwise, load-produced torque acts in the counterclockwise direction, which direction is the same as that of the rotational force-component received by the sleeve 23 from the driving means 11.

As explained in the fourth functional mode, the net axial thrust force received by the sleeve 23 continues to act in a direction toward the first annular member 63, but decreases in magnitude, after the change in direction of the load-imposed torque. Thus, the sleeve 23 initially remains uninterruptedly locked to the first annular member 63. When the direction of the net axial thrust force-component changes, as is the case when the load-produced torque received by the sleeve 23 is greater than the driving-means torque received by the sleeve, the net axial thrust force unlocks the sleeve from the first annular member 63, by relaxing the strain of the sleeve from the first annular member, and moves the sleeve away from contact with the first annular member and into contact with the second annular member 64. Since the second annular member 64 is prevented from counterclockwise rotation by its associated ratchet 106, braking occurs as soon as the counterclockwise-rotating sleeve 23 contacts the second annular member. Consequently, the load 16 cannot overspeed the driving means 11 when acting in the aiding direction relative to the torque-direction of driving means; moreover, an aiding load cannot prevent precise positioning of such load, for as soon as the desired position is reached and upon the driving means being placed it in its power-off condition, the torque applied to the input member 41 by the driving means is eliminated, and the braking-coupling mechanism 10 immediately reverts to its first or second functional mode of operation. The braking and coupling device 10 reverts to the first functional mode when the load-produced torque acts in the clockwise direction, or to the second functional mode when the load-produced torque acts in the counterclockwise direction. Once the device 10 is in the first or second functional mode of operation, the load 16 is immediately locked relative to the supporting structure 18 and with substantially no possibility of movement of the sleeve 23 relative to the supporting structure. Additionally, the mechanism 10 permits movement of the load 16 in small, accurately controlled increments by manual or automatic activation and deactivation of the driving means 11.

A sixth and last functional mode is one in which the driving means 11 is initially in the power-off condition, the load 16 tends to rotate the output member of the braking-coupling mechanism 10 in the counterclockwise direction relative to the supporting structure axis 22 and the driving means subsequently is selectively activated to the power-on and counterclockwise output torque condition, thereby positioning a load that acts in the aiding direction. When the desired position is reached, the driving means 11 is deactivated and the load 16 is locked, relative to the supporting structure 18, in a precise position.

Prior to activating the driving means 11, the device 10 functions in a manner similar to the second functional mode (i.e., the force-components received by the sleeve act axially toward the second annular member 64 and a rotationally in the counterclockwise direction). The sleeve 23 is thus forced against second annular member 64 and locked together against relative rotational movement about the supporting-structure axis 22. The sleeve 23 tends to rotate in the counterclockwise direction, but is locked against rotational movement by the second annular member 64 in cooperation with its counterclockwise, rotation-preventing ratchet 108. As in the second functional mode, the braking-coupling mechanism 10 locks the load 16 against movement relative to the supporting structure 18.

To effect repositioning of an aiding load 16, the driving means is activated to the power-on and counterclockwise torque output condition. The counterclockwise torque thus imposed on the input member 41 by the driving means 11 is transmitted to the sleeve 23 through the balls 35. In this sixth functional mode, the axial thrust force received by the sleeve 23 from the driving means 11 acts in a direction toward the first annular member 63, thus subtracting from the axial thrust force produced by the load 16 and reducing the force which holds the sleeve against the second annular member 64. If the load-produced torque received by the sleeve 23 is relatively large, the torque received by the sleeve from the driving means reduces the force holding the sleeve against the second annular member 64 enough to permit slippage between the sleeve and second annular member. The outside forces acting on the load e.g., wind forces on an airplane control surface) actually reposition the load with the driving means simply releasing the brakes of the braking-coupling mechanism 10. During this repositioning of an aiding load, the sleeve second end face 31 continually slips against the second annular member 64. Once the desired position is reached and upon the driving means 11 being deactivated to the power-off condition, the device 10 again functions in the manner similar to the second functional mode and the load 16 is locked relative to the supporting structure 18 in a precise position.

If the load-produced torque received by the sleeve 23 is relatively small, the torque received by the sleeve from the driving means 11 overcomes the force holding the sleeve against the second annular member 64 and the net axial force acts in the direction of the first annular member 63. The first annular member 63 is free to rotate in the counterclockwise direction and the device 10 functions as described in several of the preceding functional modes. When the driving means 11 is deactivated, the load-produced forces received by the sleeve 23 moves the sleeve into firm contact with the second annular member 64 and, as described before, the braking-coupling device 10 locks the load 16 against movement relative to the supporting structure 18.

As in the fourth functional mode, the sixth functional mode illustrates that a braking-coupling mechanism 10 is as durable, reliable, and smooth in operation when positioning an aiding load 16 as when positioning an opposing load; for, although slippage may occur between the sleeve 23 and one of the annular members 63 or 64, the contact between the sleeve and respective annular member is relatively light and the contacting surface areas are relatively large. The pressure of the sleeve 23 against a respective annular member 63 or 64, when slippage occurs during the repositioning of an aiding load, is relatively low and thus no galling or rapid wear occurs. Moreover, such light contact between the relatively large contacting surface areas of the sleeve 23 against a respective annular member 63 or 64 prevents a large temperature increase in the rubbing parts.

The braking-coupling mechanism's capability of braking and locking a load 16 is substantially unaffected by wear of the contacting surfaces of the mechanism's sleeve 23 and the annular members 63, 64 because the relative axial movements between the sleeve and annular members are not limited to a specific maximum dimension. If wear increases the clearance between the sleeve 23 and an annular member 63 or 64, the sleeve is capable of increased axial movement with respect to such annular member, and the sleeve is thus always capable of being moved into firm contact with the annular members. The only adverse affect of wear on such a mechanism 10 is in the introduction of a relatively small amount of looseness between the sleeve 23 and the annular members 63, 64 which is caused by an increase in clearance between the sleeve and annular members. Undesired relative movement between the sleeve 23 and supporting structure 18 can be eliminated by tightening, against their respective ball thrust bearings 81, 85, the nuts 97, 98 located respectively on the input member first end portion 43 and output member second end portion 54. Tightening of the nuts 97, 98 moves the ball thrust bearings 81, 85 and the annular members 63, 64 inwardly with respect to the supporting structure 18 and thus reduces the clearance between the sleeve 23 and the annular members caused by any wear. The nuts 97, 98, which are located outside the supporting structure 18, therefore present a means for convenient, external adjustment for wear.

Since firm contact is always obtainable between the sleeve 23 and annular members 63, 64, the braking surfaces of the sleeve and annular members do not require closely controlled tolerances to obtain a reliable braking and locking capability for the braking-coupling device 10. Further, a maximum braking capacity, above which capacity slippage occurs, is not employed; for, unlike many existing braking-coupling devices and by virtue of employment of a mechanical brake-releasing mechanism, the driving-means torque does not have to override incorporated brakes to reposition a load. Inherent problems associated with closely controlled tolerances of coefficients of friction, such as seizure and unreleasable locking occasioned by wear-induced galling or loss of locking capability accompanying wear and a consequent reduction of braking capacity, are eliminated because such tolerances are not utilized the mechanism 10.

The braking-coupling mechanism 10 described herein is simple, compact, and free of the need of close manufacturing tolerances that are required of many existing braking-coupling devices; therefore, not only the unit cost of such a device lowered, but its construction reduces the probability of failure because of wear-generated contamination (i.e., the introduction of wear-generated, metallic particles into clearances between moving parts). Moreover, the lower tolerances and larger clearances between parts utilizable in the device of the present invention minimize the effect of large temperature changes on the various components.

Figure 3:
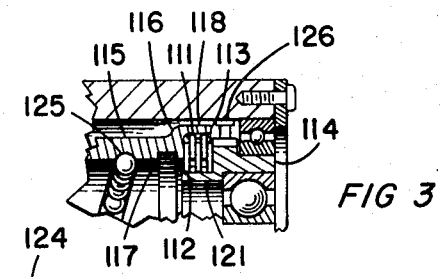
FIG. 3 is a fragmentary view similar to FIG. 2 and showing a modification of the annular members and the sleeve.

A modification of the present invention, as depicted in FIG. 3, is one in which the contacting surface areas between the sleeve 23 and the annular members 63, 64 of FIG. 2 are increased by the addition of at least two thin ring-shaped members 111, 112 located at, at least, one sleeve end face 113 of FIG. 3. Such ring-shaped members 111, 112 are coaxial with the sleeve and annular members of FIG. 3 (only one annular member 114 shown) and mounted between at least one of the annular members such as 114 and the sleeve 115. Preferably, several of each ring-shaped member 111 and 112 are used at each sleeve end faces 113 (only one of two sleeve end faces shown in FIG. 3) in a typical, multiple-disc braking arrangement, thus enabling the device shown in FIG. 3 to transmit and to brake torques of larger magnitude than devices with lesser braking areas.

Figure 4:
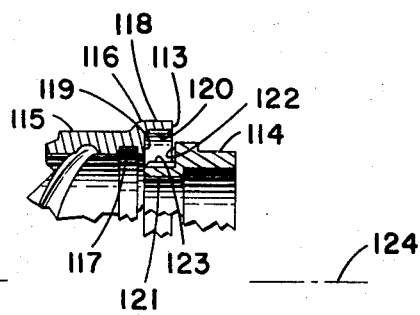
FIG. 4 is a view of the sleeve and annular member of FIG. 3 certain parts being removed.
Figure 5:
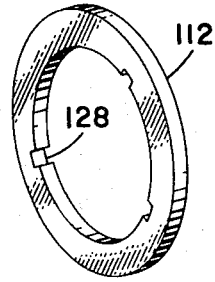
FIG. 5 is a perspective view of one of the brake discs of the apparatus of FIG. 3.
Figure 6:
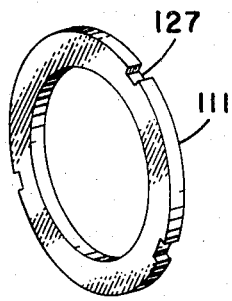
FIG. 6 is a perspective view of another of the brake discs of the apparatus of FIG. 3.

The modified sleeve 115 has enlarged-diameter portions such as 116 at the sleeve end 118; each region of enlarged external diameter of the sleeve begins at a respective sleeve end face 113 (other end face not shown) and extends inwardly toward the sleeve center for the short distance approximately equal to the distance from the sleeve end face 113 to its associated outer resilient retainer groove 117. The internal diameter of the sleeve 115 at each sleeve end 118 (other end not shown) is also enlarged, thus forming a coaxial, internal recess 119, as shown in FIG. 4. Internal splines such as 120 are located in the sleeve recesses, and the splines are parallel to the sleeve axis 124.

The first end portions of the modified annular members, as represented by 114, are lengthened; the internal diameters of the lengthened annular member first end portions such as 121 are the same as the internal diameter of the original annular member first end portions such as 69 of FIG. 2, but the external diameters of the lengthened first end portions are smaller than the diameter of the original first end portions. The junction of the external diameters of each annular member 114, as shown in FIG. 4, thus forms an external shoulder 122 of the modified annular member first end portion 121. The first end portions of the modified annular members 114 extend within the respective sleeve ends 118 so that the external shoulder of each modified annular member first end portion 121 is adjacent and in confronting relation to the plane in which the respective sleeve end face 113 lies. External splines such as 123 are located around the smaller external diameter portion of each of the modified annular member first end portions 121, which splines are parallel to the respective modified annular member axis 124.

Referring to FIGS. 3, 4, 5, and 6, ring-shaped members 111 with slots 127 in their outer peripheries for engagement of the sleeve splines 120 are slidably mounted on the sleeve splines within the sleeve recess 119, and such ring-shaped members are positioned in alternation with ring-shaped members 112 with inner-periphery slots 128 for sliding engagement of the annular member splines 123.

In operation, the braking-coupling mechanism of FIGS. 3, 4, 5, and 6 functions in the same manner as the above-described mechanism of FIG. 2. The ring-shaped members 111 which are slidably engaged with the sleeve splines 120 are prevented from relative rotation with respect to the sleeve 115 by the sleeve splines, and the ring-shaped members 112 which are slidably engaged with the annular member splines 123 are prevented by the latter from relative rotation with respect to the annular members 114. When no torque is imposed on the input member or the output member (not shown) of the device of FIGS. 3, 4, 5, and 6, the sleeve 115 is centered between the annular members 114 by the force provided by resilient members such as spring washers 104 of FIG. 2. When the sleeve 115 is centered relative to its range of travel, the bottom of the sleeve recess 119 (FIG. 4), the ring-shaped members 111, 112, and the external shoulders of the annular member first end portions 121 are in lightly dragging contact with each other. Torques applied to the input or output member of the mechanism of FIGS. 3, 4, 5, and 6 are transmitted to the sleeve 115 through the plurality of balls 125 located in the thread channels identical with those of FIG. 2, and such torques immediately tend to rotate the sleeve as previously described in the description of the device of FIG. 2; and the net axial thrust force component of torque thus received by the sleeve moves the sleeve axially with respect to its axis 124. In the second functional mode of the device of FIGS. 3, 4, 5, and 6 (wherein the driving means is in the power-off condition and a load tends to rotate the output member in a counterclockwise direction), the axial thrust force-component of the load-produced torque received by the sleeve 115 acts in a direction that moves the sleeve toward the second annular member of FIG. 3. The bottom of the sleeve second end recess 119 pushes against the ring-shaped members 111, 112, thus sliding the ring-shaped members along their respective splines 120, 123 and firmly against each other and the shoulder on the second annular member first end portion 121. Concurrently with the above, the rotational force-component of load-produced torque received by the sleeve 115 acts in a direction which tends to rotate the sleeve in the counterclockwise direction. The second annular member of FIG. 3 is limited to rotation in the clockwise direction by its associated ratchet 126 and thus prevents counterclockwise rotation of the sleeve 115 as soon as the bottom of the sleeve second end recess 119 is forced against the ring-shaped members 111, 112, which ring-shaped members in turn are forced against the second annular member first end portion external shoulder 122. While the axial thrust force received by the sleeve 115 is acting in the direction of the second annular member 114, the lightly dragging contact between the bottom of the sleeve first end recess (not shown in FIG. 4), the ring-shaped members (not shown), and the first annular member first end portion external shoulder (not shown in FIG. 4) are substantially reduced, if not eliminated.

From the above description, it is apparent that the mechanism of FIGS. 3, 4, 5, and 6 not only functions in the same manner as the mechanism of FIG. 2, but has the decided advantage of more braking and locking capability because of the increased braking surface area provided by the ring-shaped members 111, 112 at each sleeve end 118. Thus, the device of FIGS. 3, 4, 5, and 6 has more torque braking and transmitting capability than the device of FIG. 2.

Figure 7:
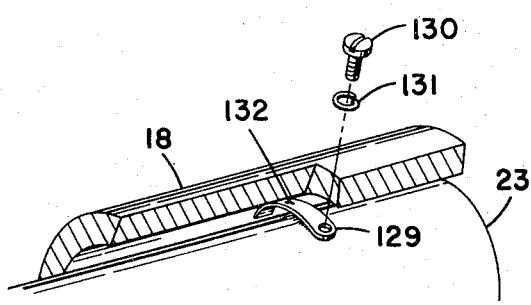
FIG. 7 is a perspective, schematic view of a modification to the present invention, a portion of the supporting structure being shown in longitudinal section.

Another modification of the present invention is shown in FIG. 7, which illustrates an alternate means for applying a lightly dragging force to the sleeve 23. In lieu of a resilient member e.g., the spring washer 104 of FIG. 2), a leaf-spring member 129 is utilized. One end of the leaf-spring member 129 is attached to the sleeve 23 by, for example, a screw 130 with a lock washer 131, and the other end 132 is in constant, dragging contact with the internal surface of the supporting structure 18. A frictional force, generated by the dragging of the leaf-spring end 132 against the supporting structure 18, is imparted to the sleeve 23 when the latter is rotated relative to the supporting structure. The force thus produced by the dragging leaf-spring member 129 and imparted to the sleeve 23 opposes the rotation of the sleeve just as the force did that was imparted to the sleeve by the resilient member of FIG. 2. The leaf-spring member of FIG. 7 constantly applies the friction-generated force to the sleeve 23, whereas the force from the resilient member 104 (FIG. 2) is essentially eliminated when the sleeve is strained against one of the annular members. Nevertheless, the device of FIG. 7 is substantially as efficient as the device of FIG. 2 and 2A, for the energy or torque receive by the sleeve 23 from the driving means 11 that is consumed by the friction-produced force of the leaf-spring member 129 is so small as to be negligible. The operation of the braking-coupling device of FIG. 7 is the same as that of the device of FIG. 2 and 2A, although the lightly dragging force applied to the sleeve 23 is supplied by the leaf-spring member 129 rather than by the resilient 104 of FIG. 2.

Figure 8:
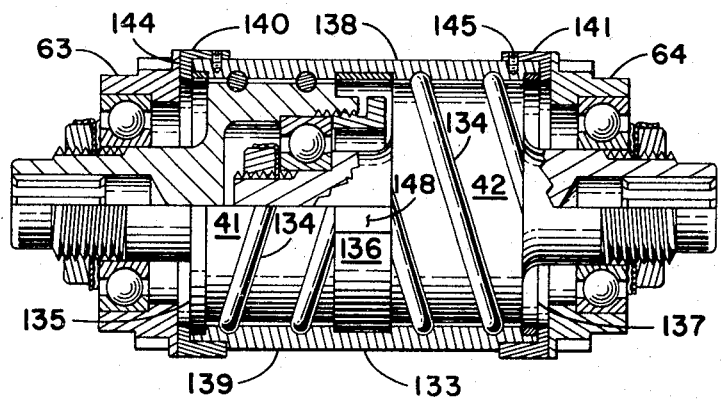
FIG. 8 is a partial, longitudinal, sectional view of a modification of the mechanism of FIG. 2.

As shown in FIG. 8, a further modification of the present invention is the replacement of the pluralities of balls 35 of FIG. 2 and 2A, located in the channels formed by the sleeve 133 and respective input and output members 41, 42, with a plurality of rods 134 wound within the above-mentioned thread-channels. The diameter of the rods 134 is the same as the diameter of the replaced balls 35. The rods 134 provide an interconnecting relationship between the sleeve 133 and the input and output members 41, 42 in place of the balls 35. The rods 134 transmit torque between the sleeve 133 and input and output members 41, 42 by a wedging action similar to the wedging action of the balls 35, but the tendency of the rods to move along the thread-channels toward the retainers 135, 136, 137 is lessened because the rods must slide, whereas the balls can roll. A larger frictional force is generated by the rods 134 sliding in the thread-channels than by the rolling in the channels, thus there is less movement of the rods along the thread-channels. The rod material is, for example, a brass alloy with a coating of polytetrafluoroethylene (such as sold under the trademark "Teflon"), graphite, or other dry lubricant.

Figure 10:
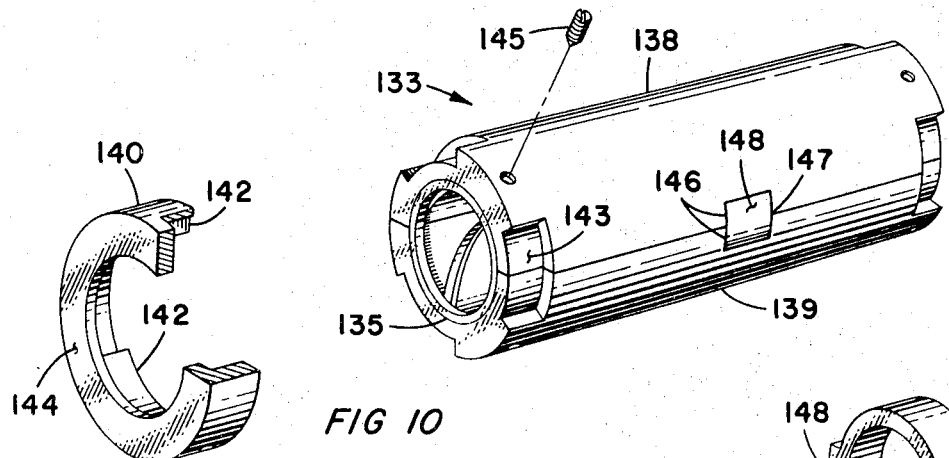
FIG. 10 is an exploded, perspective view of the sleeve and annular cap of the apparatus of FIG. 8.

For purposes of assembly of this modified braking-coupling device of FIG. 8, the sleeve 133 is modified from a one-piece construction to an assembly, as shown in FIG. 10, comprising first hand second half-shell components 138, 139 which are positioned adjacent each other to form a hollow, cylindrical shape. Means for rigidly holding the shell components adjacent each other comprise substantially identical first and second annular caps 140, 141 with a plurality of lugs 142 that closely fit into notches 143 provided in the sleeve halves. Each cap 140 or 141 has a flat surface 144 for contact thereof with the respective first and second annular members 63, 64. The annular caps 140, 141 are axially positioned on the ends of the sleeve 133 with the cap lugs 142 and sleeve notches 143 in register. Headless screws 145 lock the caps 140, 141 to the sleeve halves 138, 139. The annular caps 140, 141 rigidly hold the sleeve halves 138, 139 together; and the cap lugs 142, when engaged in the notches 143 of the sleeve halves, prevent relative rotation between the caps and the sleeve halves and prevent relative rotation between the sleeve halves. Each half-shell component of the sleeve 133 has a square notch 146 at the center of each longitudinal edge of the half-shell sleeve component 138, 139. When the half-shell components 138, 139 are positioned adjacent each other to form a hollow, cylindrical shape, the square notches 146 are in register and thus form square holes 147 that are 180° apart.

Figure 9:
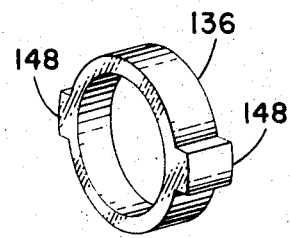
FIG. 9 is a perspective view of the central retainer of the apparatus of FIG. 8.

The resilient retainers of FIG. 2 are replaced, in the modification of FIG. 8, with metal retainers 135, 136, 137. The central metal retainer 136, as shown in FIGS. 8, 9 and 10, has lugs 148 that are spaced 180° apart on its exterior surface, that extend within the square holes 147 of the sleeve assembly 133, and which are substantially flush with the exterior surface of the sleeve assembly. The central retainer lugs 148 prevent relative axial movement between the half-shell components 138, 139, when the sleeve 133 is subjected to torques during operation. The overall length of the sleeve assembly 133, including its annular caps 140, 141, is substantially the same as the length of the sleeve of FIG. 2.

In operation, the modified braking-coupling mechanism of FIG. 8 with the rods 134 and sleeve assembly 133 functions substantially in the same manner as the form of the invention illustrated in FIG. 2 and 2A.

From the above modifications shown in FIGS. 3–10, it is apparent that additional modifications to the invention of FIG. 2 and 2A are possible. Another such modification is shown in FIG. 11, wherein thread channels filled with balls as in FIG. 2 and thread-channels filled by rods as in FIG. 8 are replaced with input and output member male threads 149, 150 which engage sleeve female threads 151, 152.

Figure 11:
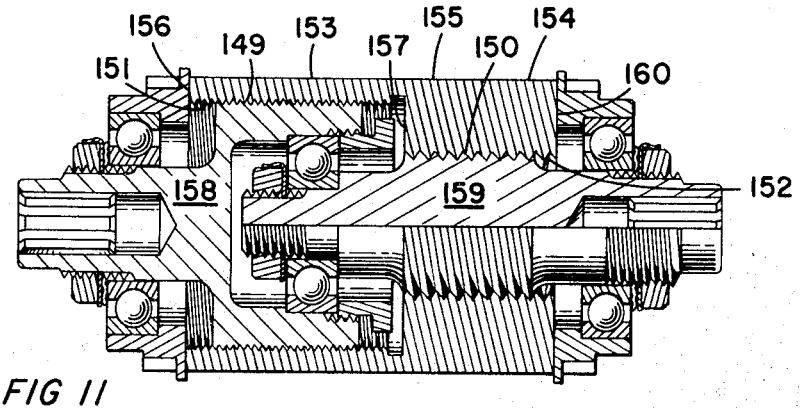
FIG. 11 is a partial, longitudinal, sectional view of a modification of the device of FIG. 2.

The modified sleeve of FIG. 11 is similar to the sleeve of FIG. 2, but the modified sleeve first end portion 153 has a larger internal diameter than its second end portion 154. The larger diameter internal portion of the sleeve 155 begins at the sleeve first end face 156 and terminates with an internal shoulder 157, which shoulder is formed by the juncture of the larger, internal-diameter portion 153 with the sleeve's smaller internal-diameter portion 154. Both sleeve end portions 153, 154 have internal female threads 151, 152 which extend over their respective end portions, but the first end portion threads 151 have a finer thread and a smaller thread lead than the second end portion threads 152. Further, the input and output members 158, 159 are capable of identical, simultaneous axial movement along the sleeve's axial 124, even though the sleeve first end portion threads 151 have an opposite-hand direction relative to the second end portion threads 152.

The input member of FIG. 11 is approximately the same as the input member of FIG. 2 and 2A, except that the input member second end portion of FIG. 11 has typical, external male threads 149 which correspond with and engage the sleeve first end portion threads of FIG. 11.

Similarly, the output member of FIG. 11 is similar to the output member of FIG. 2 and 2A, except the middle portion of the output member of FIG. 11 has reduced external diameter and external male threads 150 which correspond and engage the sleeve second end portion threads of FIG. 11.

Assembly is readily effected by assembling the input and output members 158, 159 together in the same manner as the input and output members of FIG. 2 and 2A, then inserting the output member through the sleeve first end portion 153 and engaging the output member middle portion threads 150 with the sleeve second end portion threads 152. The output member 159 then is moved toward the sleeve second end face 160. When the input member threads 19 reach the sleeve first end face 156, the input member threads are engaged with the sleeve first end portion internal threads 151. The input and output members 158, 159 are moved axially toward the sleeve second end face 160 until those members are centered in the sleeve 155.

In operation, the braking-coupling device of FIG. 11 functions in the same manner as the device of FIG. 2 and 2A, with the exception that torques imposed on the sleeve 155 are resolved into axial thrust forces and rotational forces by the sleeve threads 151, 152 and input and output member threads 149, 150.

While only one embodiment of the invention together with several modifications thereof, has been described in detail herein and shown in the accompanying drawing, it will be evident that various further modifications are possible in the arrangement and construction of its components without departing from the scope of the invention.

What is claimed is:

1. A mechanism for connecting a reversible, rotary driving means to a load to be moved thereby, said mechanism comprising:

a supporting structure having first and second, open ends, a longitudinal axis transfixing the ends, means rigidly connecting the ends in fixed relation to each other, and means for fixed mounting of the structure;

a cylindrical sleeve having a longitudinal axis and first and second end portions each provided with threads, the sleeve first end portion threads being of a direction opposite to the direction of the sleeve second end portion threads and each of the end portions having an end face;

an input member extending within the supporting structure at the first end thereof and having a longitudinal axis and threads matching the sleeve first end portion threads, the input member being provided with means for drivingly connecting it to a rotary driving means;

an output member extending within the supporting structure at the second end thereof and having a longitudinal axis aligned with that of the input member and provided with threads matching the sleeve second end portion threads, the output member being provided with means for drivingly connecting it to a load;

a plurality of balls mounted within the above-mentioned threads and in connecting relation between the sleeve and input and output members;

first and second annular members each having an end with a face confronting a respective one of the sleeve end portion faces;

means preventing rotation of one of the annular members in a first direction and of the other annular member in a second direction about the supporting structure axis;

means coaxially mounting the input, output, and annular members for rotation about the supporting structure longitudinal axis and preventing outwardly directed translation of the input, output, and annular members relative to the supporting structure; and means rotatably joining the input and output members and preventing their translation relative to each other.

2. The mechanism of claim 1, said mechanism further comprising, at least one end face of the sleeve, at least two ring-shaped members coaxial with the annular members and mounted between at least one of the annular members and the sleeve.

3. The mechanism claimed in claim 1, said means for preventing rotation of one of the annular members in a first direction and of the other annular member in a second direction about the supporting structure axis comprising a pair of ratchets.

4. The mechanism of claim 1, means being provided at each end of each of said threads for preventing escape of said balls from the threads.

5. The mechanism of claim 4, wherein each of said threads is substantially filled with said balls and wherein the means for preventing escape of the balls are resilient.

6. The mechanism claimed in claim 1, further comprising:

the input member being coaxially extended within the sleeve at the first end portion thereof;

the output member being coaxially extended within the sleeve at the second end portion thereof;

the threads of the sleeve being located internally in the sleeve; and the threads of the input and output members being located internally in the sleeve; and the threads of the input and output members being located externally on said input and output members.

7. The mechanism claimed in claim 6, the sleeve being provided with a plurality of internal, circular grooves, the sleeve end faces and internal grooves being constructed parallel with each other, and the sleeve threads being situated between and connected with the grooves; and a plurality of resilient retainers positioned within the grooves to retain the balls in the threads of the sleeve and input and output members.

8. The mechanism claimed in claim 6, wherein:

the input member has first and second end portions, the first end portion of the input member having a diameter smaller than the second end portion of said input member and the second end portion of the input member being provided with a cylindrical recess coaxial with the input member axis and with the external threads of the input member; and the output member having first and second end portions and a middle portion, the first and second end portions of the output member having respective diameters smaller than the diameter of the middle portion and the middle portion having the aforementioned external threads of the output member, the output member first end portion being positioned within the recess of the input member.

9. The mechanism of claim 8, wherein the means for drivingly connecting the input member to a rotary driving means is positioned at the first end portion of the input member.

10. The mechanism of claim 8, wherein the means for drivingly connecting the output member to the load is positioned at the second end portion of the output member.

11. The mechanism claimed in claim 1, said mechanism being provided with means for applying a dragging force to the sleeve for opposing rotary movement of the sleeve relative to the supporting structure.

12. The mechanism claimed in claim 11, said means for providing a dragging force to the sleeve comprising at least one resilient member positioned on at least one of the input and output members.

13. The mechanism of claim 11, said means for applying a dragging force to the sleeve comprising structure mounted between and in contact with the sleeve and supporting structure.

14. A mechanism for connecting a reversible, rotary driving means to a load to be moved thereby, said mechanism comprising:

a supporting structure having first and second, open ends, a longitudinal axis transfixing the ends, means rigidly connecting the ends in fixed relation to each other, and means for fixed mounting of the structure;

a cylindrical sleeve having a longitudinal axis and first and second end portions each provided with threads, the sleeve first end portion threads being of a direction opposite to the direction of the sleeve second end portion threads and each of the end portions having an end face;

an input member extending within the supporting structure at the first end thereof and having a longitudinal axis and threads matching the sleeve first end portion threads, the input member being provided with means for drivingly connecting it to a rotary driving means;

an output member extending within the supporting structure at the second end thereof and having a longitudinal axis aligned with that of the input member and provided with threads matching the sleeve second end portion threads, the output member being provided with means for drivingly connecting it to a load;

a plurality of rods wound within the above-mentioned threads and in connecting relation between the sleeve and input and output members;

first and second annular members each having an end with a face confronting a respective one of the sleeve end portion faces;

means preventing rotation of one of the annular members in a first direction and of the other annular member in a second direction about the supporting structure axis;

means coaxially mounting the input, output, and annular members for rotation about the supporting structure longitudinal axis and preventing outwardly directed translation of the input, output, and annular members relative to the supporting structure; and means rotatably joining the input and output members and preventing their translation relative to each other.

15. The mechanism claimed in claim 14, said sleeve being constructed as an assembly comprising:

fist and second half-shell components positioned adjacent each other and forming a hollow, cylindrical shape; and means for rigidly holding the half-shell components adjacent each other.

16. A mechanism for connecting a reversible, rotary driving means to a load to be moved thereby, said mechanism comprising:

a supporting structure having first and second, open ends, a longitudinal axis transfixing the ends, means rigidly connecting the ends in fixed relation to each other, and means for fixed mounting of the structure;

a cylindrical sleeve having a longitudinal axis and first and second end portions each provided with female threads, the sleeve first end portion threads being of a direction opposite to the direction of the sleeve second end portion threads and each of the end portions having and end face;

an input member extending within the supporting structure at the first end thereof and having a longitudinal axis and male threads engaging the sleeve first end portion female threads, the input member being provided with means for drivingly connecting it to a rotary driving means;

an output member extending within the supporting structure at the second end thereof and having a longitudinal axis aligned with that of the input member and provided with male threads engaging the sleeve second end portion female threads, the output member being provided with means for drivingly connecting it to a load;

first and second annular members each having an end with a face confronting a respective one of the sleeve end portion faces;

means preventing rotation of one of the annular members in a first direction and of the other annular member in a second direction about the supporting structure axis;

means coaxially mounting the input, output, and annular members for rotation about the supporting structure longitudinal axis and preventing outwardly directed translation of the input, output, and annular members relative to the supporting structure; and means rotatably joining the input and output members and preventing their translation relative to each other.

17. The mechanism claimed in claim 16, said sleeve having a larger internal diameter for the first end portion than the diameter of its second end portion.

18. The mechanism claimed in claim 17, the threads of the sleeve first end portion having a finer thread and smaller thread lead than the threads of the sleeve second end portion and the input member and output member having the capability of identical, simultaneous axial movement with respect to the sleeve

* * * * *